United States Patent

[11] 3,613,874

| [72] | Inventor | Harmon B. Miller<br>Atlanta, Ga. |
|---|---|---|
| [21] | Appl. No. | 851,978 |
| [22] | Filed | Aug. 21, 1969 |
| [45] | Patented | Oct. 19, 1971 |
| [73] | Assignee | Reclosable Package Corp.<br>Atlanta, Ga. |

[54] RECLOSABLE PACKAGE
21 Claims, 13 Drawing Figs.

[52] U.S. Cl. ............................................ 206/46 F,
161/252, 161/406, 206/56 AA, 206/DIG. 18,
229/51 WB, 229/62
[51] Int. Cl. ..................................................... B65d 33/18,
B65d 77/12, B65d 85/00
[50] Field of Search .......................................... 206/46 R,
46, 56 AA, DIG. 18; 229/51 WB, 51 RC, 51 S, 66,
62, 48 SA, 48 SB; 161/406, 252

[56] References Cited
UNITED STATES PATENTS

| 2,063,999 | 12/1936 | Harrison | 229/51 WB |
| 3,104,798 | 9/1963 | Stone | 229/62 |
| 3,184,149 | 5/1965 | Repko | 229/66 |
| 3,278,109 | 10/1966 | Salway | 229/62 |
| 3,313,471 | 4/1967 | Dickard et al. | 229/66 |
| 3,329,331 | 7/1967 | Morgan | 161/406 |

FOREIGN PATENTS

| 739,305 | 7/1966 | Canada | 229/66 |

Primary Examiner—William T. Dixson, Jr.
Attorney—Cushman, Darby & Cushman

ABSTRACT: A tape comprising two layers of flexible sheet material bonded together by pressure-sensitive adhesive. The outer surfaces of the sheet material are coated with a permanent-type adhesive such as a heat seal material. The tape is sealed between facing members of a flexible pouch adjacent one edge. A tear strip is provided for tearing open the pouch and removing the portion of one of the facing members bonded to one side of the tape. At least a portion of the pressure-sensitive adhesive remains with the other side of the tape bonded to the other facing member of the closure. This other facing member can be folded over and adhered to the outside of the package by means of the remaining pressure-sensitive adhesive.

PATENTED OCT 19 1971
3,613,874
SHEET 1 OF 3
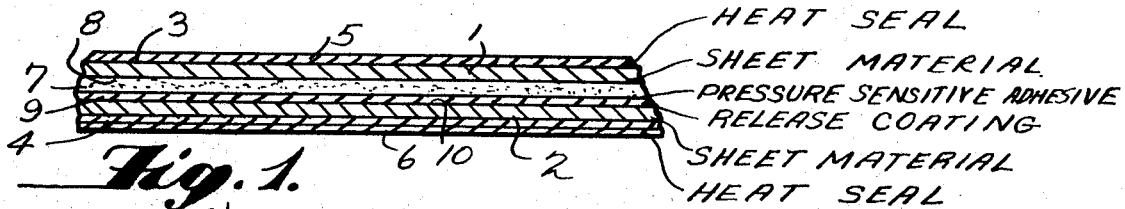
Fig. 1.
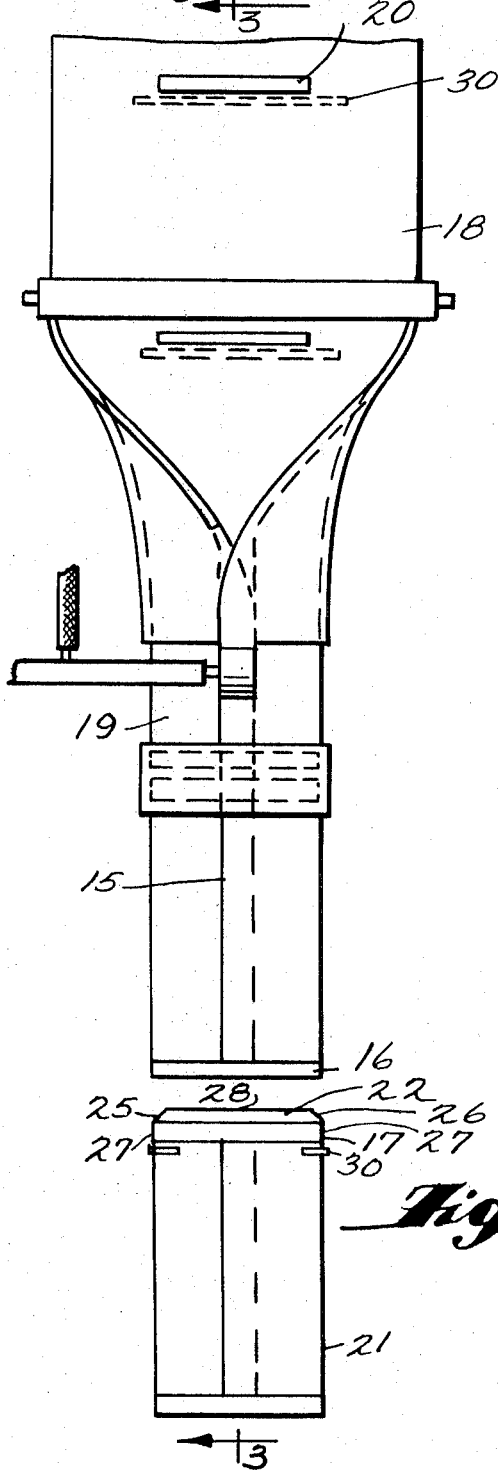
Fig. 2.
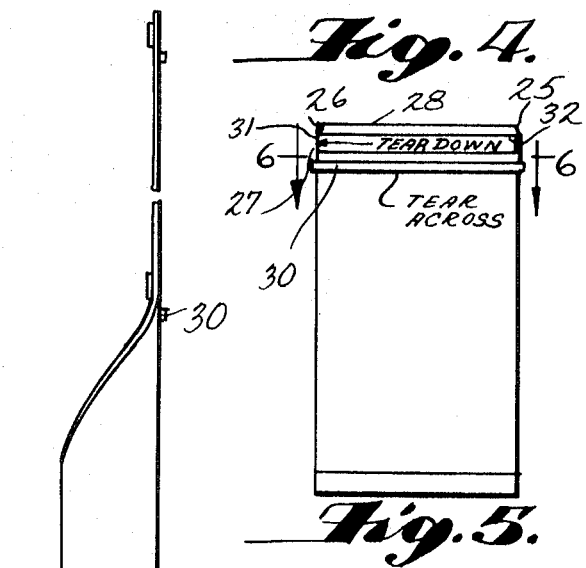
INVENTOR
HARMON B. MILLER
BY
Cushman, Darby & Cushman
ATTORNEYS

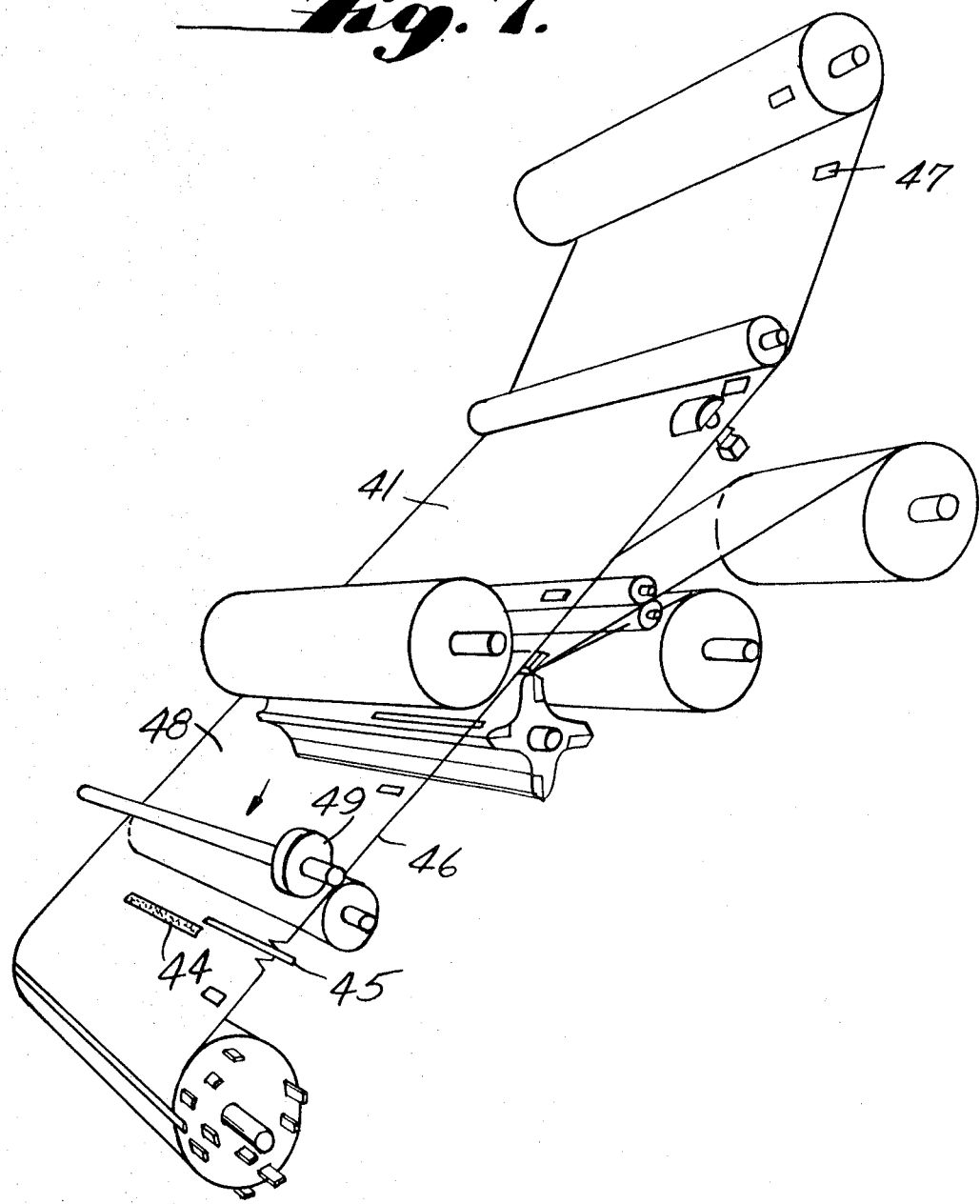

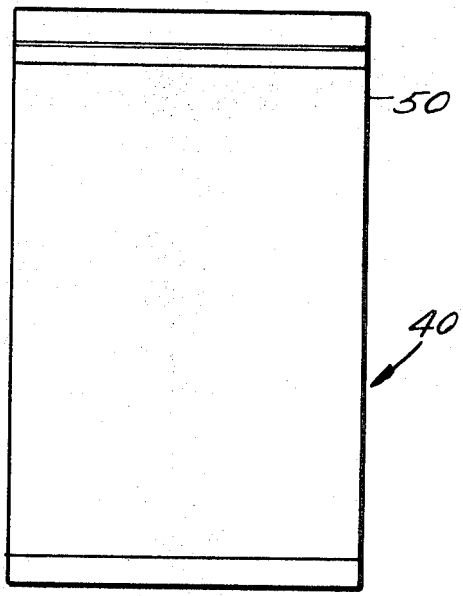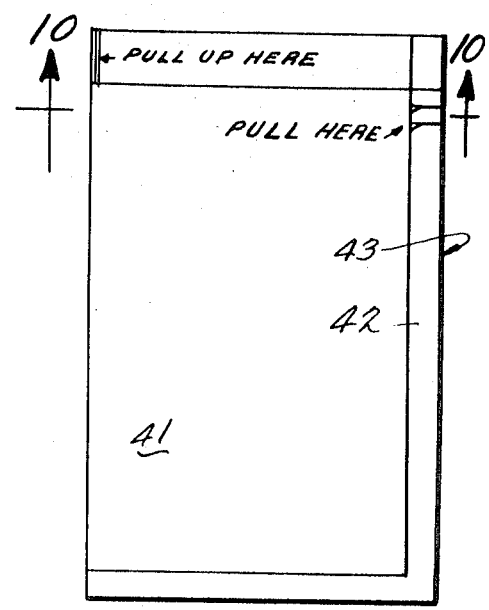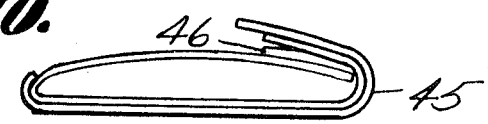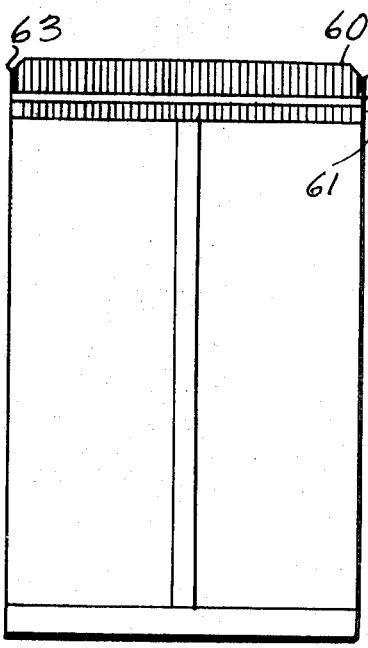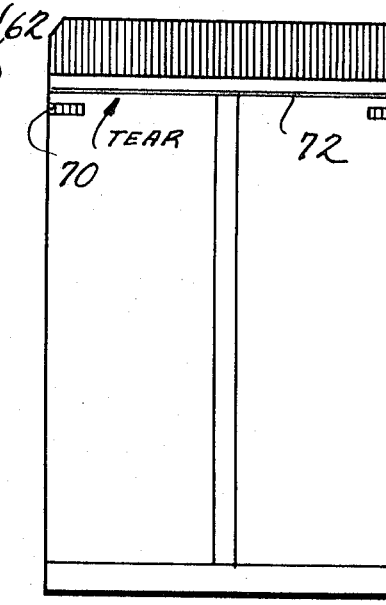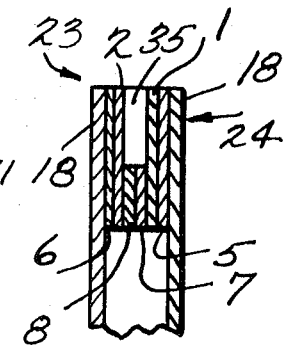

RECLOSABLE PACKAGE

The present invention relates to a reclosable package and more particularly to a package having a pressure-sensitive adhesive closure. The invention is particularly useful for flexible bag packages, especially for food which is affected by exposure to air.

Many packages contain larger quantities of food than will be served at one time and it is necessary to store part of the food in the package after the package has been opened. For this purpose, many households are equipped with a variety of storage containers, made of glass, plastic and the like. However, enterprising food producers have found that consumers would prefer to buy food in packages which themselves may serve as storage containers. Therefore, a variety of packages have been produced which can serve as permanent receptacles, i.e., which are not rendered useless when the package is opened.

Such packages are more expensive and therefore increase the cost of the food they contain, which has reduced their use. In part this increase in cost results from the need to construct the package so that it can be opened and closed repeatedly. Reclosing of many ordinary packages is made difficult because they are initially closed by means of a heat seal adhesive which is quite easy to apply in automatic packaging machinery. Unfortunately, the heat seal adhesive loses its adhesive properties once the package is opened, and therefore is not useful for reclosing the package.

It has been recognized that pressure-sensitive adhesives do not suffer this difficulty. However, they are difficult to use in automatic packaging machinery. A package to which such adhesive is applied will stick at least temporarily to almost any surface it contacts, because this kind of adhesive is permanently tacky, unlike heat seal adhesives which only become tacky when heated.

An approach to the problem is described in my earlier U.S. Pat. No. 3,272,422. In that patent, a closure was described having a coating of pressure-sensitive adhesive, covered with a peelable film, the latter being heat-sealed to a receptacle. The arrangement was such that, after heat-sealing the closure to the receptacle, the closure could be opened by separating the pressure-sensitive adhesive from the peelable film. When the closure was replaced, the pressure-sensitive adhesive stuck to the peelable film, from which it could be separated again and to which it could be resealed repeatedly. This permitted reclosing the package numerous times.

In my prior U.S. Pat. application Ser. No. 795,586 filed Jan. 31, 1969 now abandoned, I described a way to utilize the principles of the foregoing invention in certain types of conventional packages for which it was not originally well suited, and also for improving the ease of manufacturing packages having a pressure-sensitive adhesive reclosable seal. Briefly, this was accomplished by use of a tape comprised of two sheets of material, one side of each sheet being laminated to the other sheet by a pressure-sensitive adhesive with each sheet coated with a heat seal adhesive on its other side. The heat seal adhesive was selected to form a stronger bond with the package than the bond produced by the pressure-sensitive adhesive. The tape is applied between facing members of the closure of a conventional package which ordinarily are heat-sealed to each other.

One difficulty which has been encountered with packages of this type is that, while reclosable, they retain their original size. Thus, when part of the food is removed for such a package, and after the package is reclosed, a considerable volume of air is enclosed in the package with the unused food. The air contains oxygen and moisture which may reduce the freshness of the food. Another difficulty results from the mobility of the product in the package. When part of the product is removed, the residue is free to move about in the vacated space. In accordance with the present invention, means are provided for reducing the size of the package after food has been removed so that freshness is better preserved. Briefly, this is accomplished by providing means for removal of one of the facing members of the closure and the portion of the tape heat-sealed to it, the remaining portion of the tape and the other facing member carrying the pressure-sensitive adhesive. After removing the desired quantity of food, the remaining facing member is moved against another portion of the package in such a way as to reduce its volume. Desirably, indicia are printed on the package instructing the consumer to remove the first facing member, and, in some embodiments, the aforesaid tape is constructed and used so that it facilitates removing the closure member. By reducing the volume of the package, breakage of fragile articles also is reduced. The effect is somewhat similar to the effect of seat belts in automobiles which prevent injury in collisions by preventing the so-called secondary collision between the passengers and the vehicle. If the food doesn't fly through the package and strike its wall when the package is agitated or dropped, breakage is reduced in such fragile snack foods as potato chips and cheese curls. Furthermore, if the package has been gas flushed prior to sealing, especially with a heavier than air gas such as carbon dioxide, there is a possibility of a part of the gas remaining trapped in and around the product if its mobility is reduced in this way.

The invention will be better understood by considering the following description of preferred embodiments, wherein reference will be made to the drawings, in which:

FIG. 1 is a cross section of the tape used in the present invention;

FIG. 2 is a schematic view showing manufacture of flexible pouches in accordance with the invention;

FIG. 3 is a cross section along lines 3—3 of FIG. 2;

FIG. 4 is an elevation of the package from the side not seen in FIG. 2;

FIG. 5 shows reclosing the package;

FIG. 6 is a section along lines 6—6 of FIG. 5;

FIG. 7 is a perspective view showing one stage in the manufacture of a plastic film useful in another embodiment of the present invention;

FIG. 8 is an elevation showing one side of a package made with the film shown in FIG. 7;

FIG. 9 is an elevation showing the other side of the package of FIG. 8;

FIG. 10 is a cross section along lines 10—10 of FIG. 9;

FIG. 11 is an elevation of a further embodiment;

FIG. 12 is an elevation of yet another embodiment; and

FIG. 13 is a cross section through a part of a package which is a modified form of the embodiment of FIGS. 1—6.

As seen in FIG. 1 of the drawing, the tape utilized in this invention comprises two pieces of sheet material 1 and 2, adhered together with their outer surfaces 3 and 4 coated with layers of heat seal adhesive 5 and 6. The sheet 1 is coated with a pressure-sensitive adhesive layer 7 on the inner surface 8, which faces the sheet 2. The other sheet 2, in the embodiment shown, is coated with a release coating 9 on the inner surface 10, which faces the sheet 1. The pressure-sensitive adhesive layer 7 is adhered to the release layer 9, so that the two sheets form an integral article. It also is possible to apply pressure-sensitive adhesive to surface 10, so that the package is opened by prying apart two layers of pressure-sensitive adhesive. This gives a firmer bond, but is harder to open. Also, the same effect can be obtained by replacing the release coating 9 with a primer, described below, to which the pressure sensitive adhesive bonds strongly.

The pressure-sensitive adhesive may be any available pressure-sensitive adhesive mass, its composition not being an element of the present invention. It is well known to those skilled in the art that pressure-sensitive adhesive coatings possess a fourfold balance of tackiness, cohesion, elasticity and stretchiness. This balance is achieved for example in a blend of rubber and a resin, the rubber providing cohesion and elasticity and the resin providing tackiness and modification of stretchiness and elasticity. It also is known to use certain acrylate polymers in the mass, which inherently possess the necessary fourfold balance of properties. Materials of this type are readily available commercially, and manufacturers will provide information on materials to be used, taking into account the composition of the paper sheet 1 and the heat seal adhesive layers 5 and 6, as explained below. Where necessary, a primer coating may be used under the pressure-sensitive adhesive, to assure a firm bond. It also will be understood that, when food products are to be packaged, it may be necessary to take into account the toxicity of materials used.

Similarly the release layer 9 is a conventional material, which provides a surface to which the pressure-sensitive adhesive will adhere but from which it may be separated without delamination. Such materials commonly are applied to the back of pressure-sensitive adhesive tape which is sold in roll form, and to disposable release papers which sometimes are laminated to articles such as decorative wall coverings to temporarily cover a pressure-sensitive adhesive coating prior to use of the article.

The heat seal adhesive layers 5 and 6 are also composed of conventional materials. These include both thermoplastic and thermosetting types. The former are materials which reversibly soften on heating and become firm again on cooling. "Thermosetting"d refers to materials which tend to soften initially on heating but become irreversibly hardened as heating continues. A wide variety of suitable materials are described in catalogs and elsewhere, for example, in Modern Packaging Encyclopedia. This adhesive forms stronger bonds with the package than the pressure-sensitive adhesive forms between the sheet material layers 1 and 2. Consequently, they remain sealed to the package but are separated from each other when the package is opened.

The present invention also is applicable to a package made without the aforesaid tape, i.e., in which pressure-sensitive adhesive is applied by other means between facing members of a closure. In accordance with this embodiment, one of the facing members is removed and the pressure-sensitive adhesive is applied so that when the package is opened and one of the facing members is removed, at least a part of the adhesive remains on the other member. For example, a primer, as described above, may be first applied to the side which is to remain. However, this embodiment is less desirable, because the tape facilitates opening the package and removal of one of the facing members as described below.

FIG. 2 shows one way in which the invention can be used on a pouch made of flexible plastic. In this embodiment, the package may be a tube made by folding a flat film and sealing along a longitudinal seam 15 and at the ends, 16 and 17.

The formation of the package is illustrated schematically in FIG. 2. A flat film 18 is folded over a hollow die into a tube 19 which moves downwardly. The lower end is flattened and heated to form the seal 16, while at the same time forming the upper seal 17 of the preceding package. The seal along the seam 15 is formed by passing the seam along a heated member as the film and packages move downwardly. The top package shown in the drawing which is sealed only at the bottom, is filled through the hollow die around which the tube is formed. Then the tube moves down, and the just-filled package is sealed at its top while the bottom seal 16 of the next package is formed. As seen at the top of FIG. 2, a tape 20 according to the present invention has previously been adhered to the film. That is, one of the layers of heat seal adhesive has previously been bonded to the film. The tape 20 is about one-half the width of the film and is adhered to the central portion of the film, the other portions being sealed to the other layer of heat seal adhesive when the package is closed.

As seen near the bottom of FIG. 2, the lowermost package 21 is severed from those above, usually after the package immediately above has been sealed at its top. In this regard, it will be noted that in a narrow band 22 of the tube 19 the tape is omitted between the seals 16 and 17. The tube is slit at the top of this band, to sever the package 21. As seen at the bottom of FIG. 3, this provides tabs 23 and 24 which are easily gripped to facilitate opening the package. A similar effect can be achieved if the tape is heat-sealed up to the top of the bag with the pressure-sensitive adhesive omitted in a narrow band between the sheet members adjacent the top edge of the bag. In this way the tape reinforces the tabs 23 and 24. A view showing this latter embodiment is seen in FIG. 13 where numbers correspond to those in FIGS. 1-6. It will be noted that the sheet members 1 and 2 extend to the top edge of the bag, along with the heat seal layers 5 and 6. However, the pressure-sensitive adhesive and optionally the release layer are omitted from a band 35 across the top edge.

Also, as can be seen at the bottom of FIG. 2 and in FIG. 5 the corners of the package, at the ends of the package, are cut away at 25 and 26, so that the edge of the package extends diagonally between the perpendicular side and top edges 27 and 28 to help in removing a part of the closure as described below. This may be accomplished by cutting notches in the film and, if necessary, in the tape before assembly and forming into a bag or a cutter can be included in the heat seal mechanism shown in FIG. 2.

The package thus produced is known as a pillow-type pouch, one web-vertical seam, top and bottom seams. However, the invention also may be used with other types of pouches, some of which are described in Modern Packaging Encyclopedia, 1968 issue, at page 211. In general, the packages will be made of flexible plastic films such as polyethylene polypropylene, polystyrene, saran (vinylidene chloride copolymer, usually with vinyl choloride), regenerated cellulose, nylon, polyester (polyethylene terephthalate and the like) and cellulose acetates. Such films are flexible when sufficiently thin, and ordinarily the film will not exceed 10 mils, preferably 5 mils. The films may be coated, and flexible laminates may be used, e.g. with foil, paper and the like. Packages also may be made without plastic film, for example, with flexible aluminum or steel foil, generally less than 5 mils thick, wax or glassine paper of similar thickness, plastic coated or impregnated paper and other flexible film and sheet materials. The essential requirements are that the film or other material of which the package walls are composed are flexible or foldable in such a way that the consumer can manually collapse the portion of the package from which the originally packaged commodity, has commodity removed and fold the surface of the remaining closure member which carries pressure sensitive adhesive against an exterior wall of the package to hold the package walls collapsed. In flexible pouches, a preferred shape is rectangular or square with the closure extending along one edge. However, the pouch may be circular with the closure members extending along a portion of the perimeter or, in a rectangular package, the closure may extend across a corner and along part of the two adjoining side edges. The preferred shape is rectangular with a closure along one edge, however, because of the ease of manufacturing such packages in conventional machinery with very little modification.

In accordance with the preferred form of the present invention, a tear strip 30 is provided immediately below and parallel to the tape to tear away the portion of the bag to which the release paper layer 2 is heat sealed. By tear strip, I refer to an elongated strip of plastic or other material adhered to the film of which the bag is made. The tear strip should have fairly high tensile strength and should be bonded to the film rather strongly in such a way that the strip will not break and/or pull away from the film but will overcome the film's tear strength when it is pulled. For example, the tear strip may be nylon or polypropylene tape, or it may have bonded within it a fine-spun or continuous filament yarn.

There are several ways in which the tear strip may be associated with the film. It may be bonded to the same side of the film as the release paper layer 2, i.e., within the bag itself, when pulled outwardly from the bag, this type of strip will tear through the film. The tear strip may also be on the outside of the bag, as shown in FIGS. 1-6, strongly bonded to it, so that it will pull out a thin strip of film when pulled. The film used in the package preferably has relatively low tear strength to facilitate operation of the tear strip. Conveniently, the tear strip also is preapplied to the film from which the bag is made.

To open the package shown in FIG. 1-6, the facing closure members are pulled apart. In the embodiment shown in FIGS. 1-5, the sheet material portions 1 and 2, and the portions of the bag to which they are sealed, are pulled apart. At the same time, the side edges of the bag are torn down to the tape. An important advantage of the preferred embodiment especially as seen in FIG. 6 is that the strip extends around the side edges and part way across the back from both edges. Preferably, one end of the strip is left unadhered so that it is easier to pull. The preferred construction, as seen in FIGS. 1-6, permits tearing open the side edges between the tape sections but the tear strips stops the tear, preventing it from running down to lower parts of the bag. The sheet materials 1 and 2 of the tape help in this operation by reinforcing the film of which the pouch is made. As mentioned above, the upper corners of the bag are beveled at 25 and 26 to facilitate this side-tearing operation.

To help in tearing down, the film may be perforated along a line covered by the tape. The perforations do not result in leakage because the film is laminated to the tape with a heat seal which is an effective hermatic seal.

Next the tear strip is pulled, separating from the pouch the release layer 2 and the portion of the film bonded to it. After extracting a portion of the contents, the upper portion of the pouch is folded over the lower portion containing unconsumed contents and the sheet 1 and adhesive layer 7 are adhered to the exterior of the lower part of the pouch as seen in FIG. 5. Whenever further contents are to be removed, the package can be reopened. If it is desired to pour from the package, the sheet member 1 can be held up and the contents poured over the edge from which the sheet member 2 has been removed.

Generally, it is preferred that the tear strip be at or very near the edge of the tape 20 remote from the edge of the pouch, as well as being parallel to and coextensive with that edge of the tape. The tear strip may overlap the tape, or be spaced a short distance away, preferably no more than one-fourth to one-half inch. Greater spacing makes it more difficult in obtaining a neat tear at 31 and 32.

When a tear strip is used as shown in FIGS. 1-6, this last part of the opening operation can be carried out in another way. Once the side edges are torn, the tear strip can function as a guide for tearing across the package. The consumer can, if he wishes, simply tear the sheet member 2 from the bag along the edge of the tear strip 30 which, as indicated, guides the tear. This is best achieved if the tear strip is slightly below the tape 20, so that the film 18 is torn between the sheet member 2 and the tear strip 30.

Preferably, indicia are printed on the pouch along the side edges adjacent the ends of the tape, at 31 and 32, and along the tape, together with suitable instructions as shown in FIG. 4, to inform the consumer where the pouch is to be torn.

Another embodiment of a package according to the invention can be seen in FIGS. 7-10. A bag or pouch indicated generally at 40 is flat film folded into an elongated tube 41 heat-sealed along a vertical seam 42. This is similar to the embodiment of FIGS. 2-6, except that the seal is adjacent a side edge 43 of the package. The tape 44 may be applied to the center portion of the film by a Beck Tearstripper, as indicated schematically in FIG. 7, and the tear strip 45 is applied by the same machine; however, instead of being at the center of the film, it is adjacent side edge 46. The tear strip and tape are applied as the film is transferred from one roll to another, perhaps when slit from a wider roll. Marks 47 have previously been imprinted to act as a guide for the Tearstripper to accurately position the tape and tear strip.

When the tube 4 is made, the film is folded and heat-sealed as in FIG. 2, and the edge 46 is overlapped over the other edge 48 of the film. Thus, as shown in FIG. 10, the tear strip 45 is on the outer layer of film at the overlap. As shown in FIGS. 7 and 9, the film is notched at its side edge 46 adjacent the tear strip 45 by a cutter 49 to make it easier to start a tear. A similar pair of notches may be applied on the other edge by another cutter so that both film edges, which overlap at the seam 42 are notched and both layers of film are torn across the seam.

Using this embodiment, the consumer can operate the tear strip first. It will be noted that the tear strip only extends to the other side edge 50 of the package but not around it. Therefore, upon tearing to that edge, the consumer tears up along edge 50 to the top of the bag, eliminating the need for cut away corners as shown in FIGS. 2 and 4, and the sheet member 2 and attached film can be lifted out of the way, tearing up the side edge at the other end of the tape.

Two forms of a further embodiment are shown in FIGS. 11 and 12. In these embodiments, the heat sealing at the top of the bag, to close the package and attach the film to the tape, is accompanied by crimping. To achieve this, the seal area is pressed between mating corrugated surfaces, one or both of which are heated, using conventional equipment. In the form shown in FIG. 11, there are two crimped bands 60 and 61, with the tape wide enough to lie within both bands. There is a narrow uncrimped but heat-sealed band 62 between bands 60 and 61. To open this package, the side edges are torn at 63 and 64, to the band 62. Then the release paper is torn between the crimped areas. The crimped bands will be harder to tear than the uncrimped band, assuring a fairly straight tear along the uncrimped band. The release paper, in this embodiment, should be rather easy to tear.

In the form shown in FIG. 12, the crimping extends fully across the tape but there are additional spot crimp seals of the facing sides of the film making up the bag at 70 and 71, the film itself being heat sealable to itself. These spot seals are adjacent the side edges and do not interfere substantially with removing the package contents. Preferably, they are spaced a short distance, e.g. less than one-fourth inch, below the crimp-sealed tape. The spot seals can stop a tear along the side edges of the bag and serve as a guide for starting a tear across the bag by gripping the release coated sheet of the tape, along the printed line 72, giving a fairly neat tear without a tear strip.

It is possible to omit the tear strip, as suggested above, especially when the tape is used to close the pouch. For example, if indicia are printed on the pouch below and parallel to the tape, the edge of the release paper layer 2 can serve as a guide for tearing. However, there is a tendency for the tear to run down rather than across the package so that this construction is less satisfactory. Also, it is possible to simply fold down the release layer 2 and attached pouch flap, after tearing at 31 and 32; again, this is less satisfactory because it interferes with removing the remaining contents. Another possible modification is use of tear strip at 31 and 32, either separate tear strips or continuations of strip 30. However, this is harder to apply to the packages.

It will be appreciated that while a specific type of package has been described in detail, the invention is applicable to many other kinds of packages and includes many embodiments. Therefore, it will be appreciated that changes may be made in details of construction and mode of operation without departing from the invention.

What is claimed is:

1. A package comprising a receptacle having a collapsible wall containing a commodity, and having a closure comprising a pair of facing members, pressure-sensitive adhesive between said facing members adhering them together, means for separating one of said facing members from said package without separating the other facing member from the package, the pressure-sensitive adhesive being bonded to said other facing member sufficient that at least a portion of the pressure-sensitive adhesive remains adhered to said other facing member when the removable facing layer is separated therefrom, said other facing member being movable against an exterior portion of the package to reclose it after said first facing member has been separated and a portion of said commodity has been removed, the space occupied by the removed commodity being collapsed when said other facing member is adhered to said exterior portion of the package so as to reduce the volume of air in contact with the unused portion of the commodity in the package, and thereby reduce the amount of moisture and oxygen available to deteriorate the product, the mobility of the product in the package also being reduced.

2. A packages as set forth in claim 1 wherein said facing members are adhered together by means of a tape, said tape comprising a pair of sheet members facing each other said, pressure-sensitive adhesive being between said sheet members, bonding to each other the inner surfaces of said sheet members, the other surfaces of said sheet members being permanently bonded to the respective facing members with a bond strength greater than the bond strength between said sheet members, whereby said package may be opened initially by separating said sheet members.

3. A package as set forth in claim 2 in which said permanent adhesive layers are activatable by heat.

4. A package as set forth in claim 2 in which one of said sheet members is a release paper from which said pressure-sensitive adhesive may be separated without delamination, the release paper being bonded to the removable facing member.

5. A package as set forth in claim 1 which is a pouch of flexible film, the facing members being portions of said film.

6. A package as set forth in claim 5 in which said pouch is a tube of a single-piece film, one pair of the edges of which are sealed together along a longitudinal seam, one end of said tube being permanently sealed and the other end being sealed with said tape.

7. A package as set forth in claim 6 in which the tape is sealed to said film a short space from the end of said tube, permitting insertion of fingers between the portions of said tube to which the tape is sealed to facilitate separation of said sheet members.

8. A package as set forth in claim 1 in which the means for separating one of said facing members includes a tear strip which separates removable facing member from said collapsible wall.

9. A package as set forth in claim 1 in which the means for separating one of said facing members includes printed indicia between said one facing member and other portions of the package indicating where they are to be separated.

10. In a package comprising a pouch of flexible sheet material containing a commodity, the pouch having a closure comprising facing portions of said sheet material and tape means adhering them together, the tape means comprising a pair of sheet members facing each other, pressure-sensitive adhesive between said sheet members bonding to each other the inner surfaces of said sheet members, the outer surfaces of said sheet members being permanently bonded to the respective facing members with a bond strength greater than the bond strength between said sheet members, whereby said package may be opened by separating said sheet members; the improvement for reducing the volume of said package when part of the contents are removed and for reclosing the package comprising means for separating one of said sheet members and the portion of said sheet material to which it is permanently bonded from the rest of said sheet material without separating the other sheet member from the package, the pressure-sensitive adhesive being bonded to said other sheet member sufficiently that at least a portion of the pressure-sensitive adhesive remains adhered to the other sheet member, said package being reclosable by moving said other sheet member and the pressure-sensitive adhesive bonded to it against a part of an exterior surface of said package.

11. In a package comprising a rectangular pouch of flexible sheet material containing a commodity, the pouch having a closure extending along a first edge comprising facing portions of said flexible sheet material adjacent said edge and a tape adhering said facing portions together adjacent to and along said one edge, the tape comprising a pair of sheet members facing each other, pressure-sensitive adhesive between said sheet members bonding to each other the inner surfaces of said sheet members, the outer surfaces of said sheet members being permanently bonded to the respective facing portions of said flexible sheet material adjacent to and substantially along the whole length of said edge with a bond strength greater than between said sheet members, whereby said package may be opened by separating said sheet members; the improvement for reducing the volume of said package when part of the contents are removed and for reclosing the package comprising means for separating one of said sheet members and the portion of said sheet material to which it is permanently bonded from the rest of said sheet material without separating the other sheet member from the package, the pressure-sensitive adhesive being bonded to the other sheet member sufficiently that at least a portion of the pressure-sensitive adhesive remains adhered to the other sheet member, said package being reclosable by moving said other sheet member and the pressure-sensitive adhesive bonded to it against a part of the exterior surface of said package so as to reduce the volume of air in contact with the unused portion of the commodity in the package and thereby reduce the amount of moisture and oxygen available to deteriorate the product, the mobility of the product also being reduced.

12. A package as set forth in claim 11 in which said separating means includes a tear strip extending along said flexible sheet material adjacent the edge of said tape remote from said first edge, the removable sheet member being removed upon operation of said tear strip and tearing said flexible sheet material along the edges perpendicular to said first edge adjacent the ends of said tape.

13. A package as set forth in claim 12 including printed indicia along said perpendicular edges adjacent the ends of said tape to indicate the portion of said flexible sheet material to be torn.

14. A package as set forth in claim 12 in which said tear strip extends around said perpendicular edges and partially but not completely across the other side of the package, the tear strip limiting tears along said perpendicular edges.

15. A package as set forth in claim 12 in which the pressure-sensitive adhesive between said sheet members does not extend to said first edge, a narrow strip of said facing portions being unadhered adjacent said first edge for insertion of fingers prior to opening the package.

16. A package as set forth in claim 12 in which the right-angle corners at the ends of said first edge are cut away along a diagonal connecting said first edge with the perpendicular edges to facilitate tearing said sheet material along said perpendicular edges.

17. In a package comprising a rectangular pouch of flexible sheet material containing a commodity, the pouch having a closure extending along a first edge, the other three edges being closed, said closure comprising facing portions of said flexible sheet material adjacent said first edge and a tape adhering said facing portions together adjacent to and along said first edge, the tape comprising a pair of sheet members facing each other, pressure-sensitive adhesive between said sheet members bonding to each other the inner surfaces of said sheet members, the outer surfaces of said sheet members being permanently bonded to the respective facing portions of said flexible sheet material adjacent to and substantially along the whole length of said first edge with a bond strength greater than between said sheet members, whereby said package may be opened by separating said sheet members; the improvement for reducing the volume of said package when part of the contents are removed and for reclosing the package comprising a tear strip extending along said flexible sheet material adjacent the edge of said tape remote from said first edge and printed indicia indicating a tear line along the edge of said flexible sheet material perpendicular to said first edge adjacent the ends of said tape, for separating one of said facing members and the portion of said sheet material to which it is permanently bonded from the rest of said sheet material without separating the other sheet member from the package, the pressure-sensitive adhesive being bonded to the other sheet member sufficiently that at least a portion of the pressure-sensitive adhesive remains adhered to the other sheet member, the tear strip extending around said perpendicular edges and partially but not completely across the other side to limit tears along said perpendicular edges, the pressure-sensitive adhesive not extending to said first edge, a narrow strip of said facing portions being unadhered adjacent said first edge for insertion of fingers to open the package, and the right angle corners at the ends of said first edge being cut away along a diagonal connecting said first edge with the perpendicular edges to facilitate tearing said sheet material along said perpendicular edges.

18. In a packaging material for manufacture of reclosable pouches, comprising an elongated flexible sheet material and, adhered to said sheet material at spaced points therealong a plurality of elongated tapes, said tape comprising a pair of sheet members facing each other, pressure-sensitive adhesive between said sheet members, bonding to each other the inner surfaces of said sheet members, the outer surface of one of said sheet members being permanently bonded to said flexible sheet material, the outer surface of the other of said sheet members being permanently bondable to said sheet material; the improvement comprising a tear strip extending along said flexible sheet material adjacent an edge of said tape.

19. A packaging material as set forth in claim 18 in which said tear strip and said tape are bonded to opposite sides of said flexible sheet material.

20. A packaging material as set forth in claim 18 in which the outer surface of said other sheet member is coated with a heat seal adhesive.

21. A packaging material as set forth in claim 18 in which said tear strip is longer than said tape so that, in a package formed from said flexible sheet material, the tear strip will extend around side edges and limit tears along said edges.